E. SCHNEIDER.
BRAKE OR RECUPERATOR FOR GUNS.
APPLICATION FILED MAY 15, 1917.

1,299,409.

Patented Apr. 1, 1919.
2 SHEETS—SHEET 2.

Fig. 1ᵃ

Fig. 2ᵃ

UNITED STATES PATENT OFFICE.

EUGÈNE SCHNEIDER, OF LE CREUZOT, FRANCE, ASSIGNOR TO SCHNEIDER & CIE., OF PARIS, FRANCE, A LIMITED JOINT-STOCK COMPANY OF FRANCE.

BRAKE OR RECUPERATOR FOR GUNS.

1,299,409.                Specification of Letters Patent.     Patented Apr. 1, 1919.

Application filed May 15, 1917. Serial No. 168,859.

*To all whom it may concern:*

Be it known that I, EUGÈNE SCHNEIDER, a citizen of the French Republic, and residing at Le Creuzot, France, have invented a new and useful Improvement in Brakes or Recuperators for Guns, which is fully set forth in the following specification.

This invention has for its object to provide an improved joint for the brakes and recuperators of the hydraulic, hydro-pneumatic and pneumatic type for guns, and for other purposes.

In apparatus such as the brakes and recuperators of guns, the joint packings, fixed or movable, for piston rods and pistons, are intended to withstand high temperatures and also the action of corrosive liquids. The packing constituting the joint proper should be pressed radially against the fixed or movable surface along which it moves or which moves past it, and the bearing surface of this packing must also be as small as possible in order to obviate heating.

None of the joints at present in use fulfils completely these requirements. According to this invention the desired result is attained by constructing the joint packing in the form of a ring of dermatine or hardened rubber of small width (*i. e.* extent from front to rear), inclosed laterally between rigid walls, and, according as this joint is an enveloping or an enveloped joint, mounting this packing ring in or upon a ring of flexible rubber of greater width, whereby the said packing ring is subjected solely in the radial direction to the pressure that exists inside the brake or recuperator. The transmission of the said pressure may either be effected directly with the aid of an additional spring which will insure the packing bearing against the joint surface even when the recuperator is not under pressure, or it may be effected through the medium of a movable piston-like member.

In one practical construction of the invention the rubbing surfaces of the joint packing proper may be lubricated by means of a lubricating ring arranged in an annular chamber provided in the moving part or in the fixed part as the case may be.

The manner in which this invention is to be performed will now be more particularly described with reference to the accompanying drawings which illustrate by way of example two practical constructions of the improved joint according to this invention.

Figure 1:
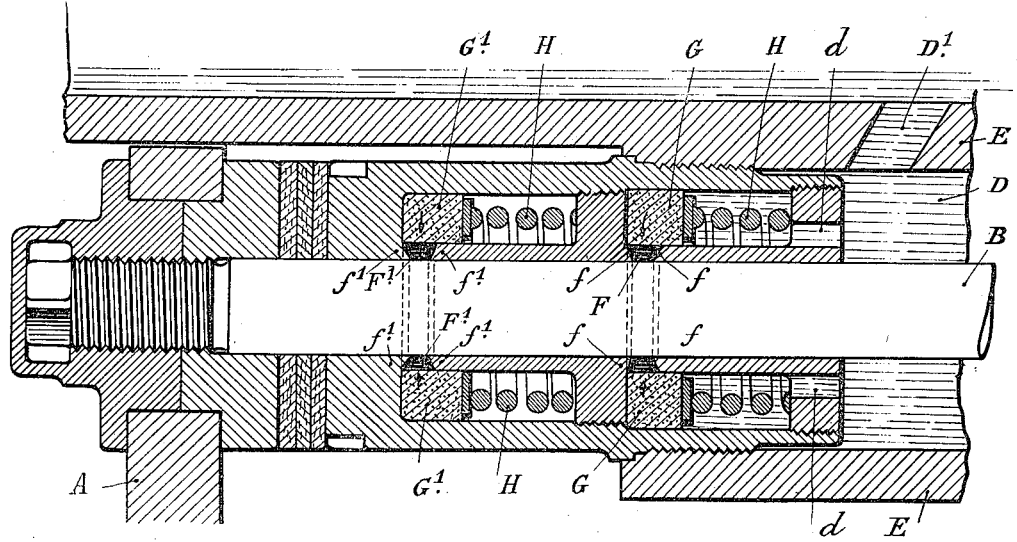

In these drawings:

Figures 1, 1ª, 2 and 2ª are longitudinal sections of two constructional forms of this invention applied to a recuperator for guns. As shown, A is the fixed part such as the gun slide or cradle to which is attached the rod B of the piston C over which the body of the recuperator formed in the sliding part E of the gun moves. D is the chamber filled for instance with liquid, and communicating in the usual manner by means of a passage $D^1$ with an air reservoir.

In both constructional forms, the joints whether fixed or movable, are formed according to this invention by a ring of dermatine or hardened rubber F of small width, and of trapezoidal, rectangular, or other suitable section, inclosed laterally between metal walls $f$, $f$, and to which the pressure existing in the recuperator is transmitted solely in the radial direction by an enveloping or enveloped rubber ring G of greater width.

By means of the communicating passages $d$, $d^1$, the pressure existing in the recuperator is transmitted to the rings G. This pressure may be increased by the pressure of a spring H which assures that the ring G shall be subjected to a pressure greater than that of the atmosphere, even when the air in the recuperator is not under pressure.

$F^1$—$G^1$ are additional safety joints formed toward the outside in front of the joints F—G; they are constructed in the same manner as the latter joints.

Figure 2:
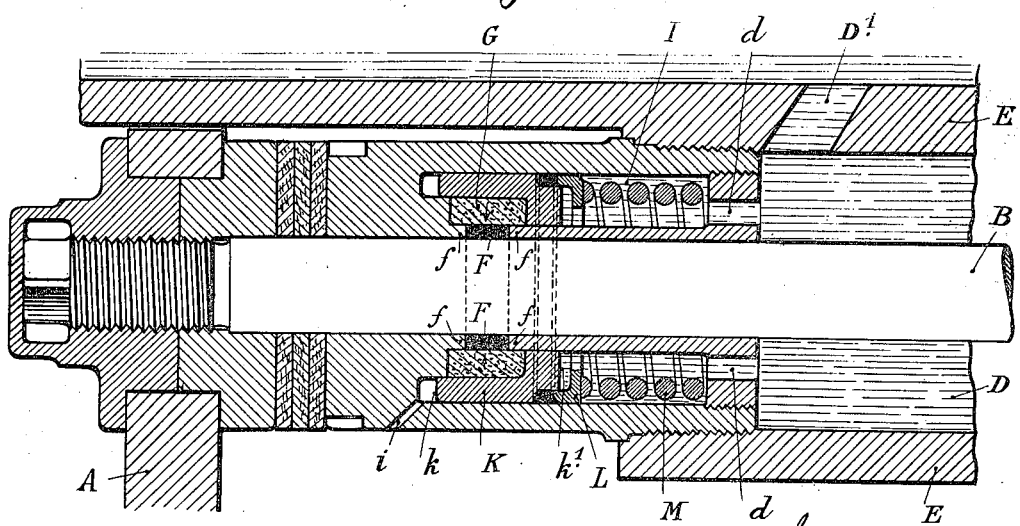

In the construction shown in Figs. 2 and 2ª, the joints F—G are formed respectively in chambers I, J, which communicate with the atmosphere through the respective passages $i$ and $j$. The ring G which transmits the pressure of the recuperator radially to the dermatine ring F, receives this pressure through the medium of a movable piston-like member K—L—M of known construction. The metal cup K of this piston-like member which envelops the ring G (piston rod joint) or is enveloped by it (piston joint) as the case may be, is subjected externally on its edge $k$ to atmospheric pressure, while it receives the recuperator pressure internally over the whole of its surface $k^1$.

The lubrication of the rubbing surface of the dermatine joints F may be assured in the manner shown by way of example in the case of the movable joint in Figs. 2 and 2ª. In an annular groove formed in the outer part of the piston there is arranged a ring of felt N impregnated with lubricant and enveloped by a leather sleeve O which becomes impregnated with the lubricant by contact with the felt while retaining the fibers of the felt in place in their containing groove.

Having now described my invention, what I claim as new and desire to secure by Letters Patent is:

1. In brakes or recuperators for guns, the combination of an elastic ring confined radially between rigid walls and subjected to pressure within the brake or recuperator, with a packing ring having a bearing surface to form a packed joint, said packing ring being located in one of the said rigid walls in contact with said elastic ring and fixedly confined at the front and rear.

2. In brakes or recuperators for guns, the combination of a packing ring of hard rubber having a bearing surface to form a packed joint, fixed confining walls at the front and rear of said packing ring, a radially confined ring of soft rubber of greater width than said packing ring engaging that surface of said packing ring opposed to its bearing surface, an abutment against which said soft rubber ring rests, and means transmitting pressure within the brake or recuperator to that side of said soft rubber ring opposed to said abutment.

In testimony whereof I have signed this specification in the presence of two subscribing witnesses.

EUGÈNE SCHNEIDER.

Witnesses:
CHAS. P. PRESSLY.
ANDRÉ MOSTICKER.